(12) United States Patent
Chan (10) Patent No.: US 8,901,971 B1
(45) Date of Patent: Dec. 2, 2014

(54) SYSTEMS AND METHODS FOR PROVIDING DIFFERENTIAL LINE DRIVERS

(71) Applicant: The Boeing Company, Chicago, IL (US)

(72) Inventor: Edward K. Chan, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/053,031

(22) Filed: Oct. 14, 2013

(51) Int. Cl.
*H03K 3/00* (2006.01)
*H03K 3/01* (2006.01)

(52) U.S. Cl.
CPC .......................................... *H03K 3/01* (2013.01)
USPC ............................. 327/108; 327/315; 326/82

(58) Field of Classification Search
USPC ............... 327/108, 315, 317–318; 326/82, 86
See application file for complete search history.

(56) References Cited

U.S. PATENT DOCUMENTS

| | | | | |
|---|---|---|---|---|
| 5,852,378 A * | 12/1998 | Keeth | ............................ | 327/171 |
| 6,124,727 A * | 9/2000 | Bridgewater et al. | ........... | 326/33 |
| 6,188,271 B1 * | 2/2001 | Wang et al. | .................... | 327/545 |
| 6,320,406 B1 * | 11/2001 | Morgan et al. | ................... | 326/14 |
| 6,495,997 B2 * | 12/2002 | Hall et al. | ...................... | 323/316 |
| 6,650,149 B1 * | 11/2003 | Wong | .............................. | 327/65 |
| 6,937,078 B2 * | 8/2005 | Schrodinger | ................. | 327/165 |
| 2011/0085617 A1 * | 4/2011 | Davis et al. | ................... | 375/295 |

* cited by examiner

*Primary Examiner* — An Luu
(74) *Attorney, Agent, or Firm* — The Small Patent Law Group, LLC; Dean Small (57) ABSTRACT

Systems and methods for providing differential line drivers include a device having an input configured to receive an input signal and a driver circuit configured to generate a first output and a second output from the input signal. The second output is a complementary output to the first output, wherein the first output has a first transfer characteristic and the second output has a second transfer characteristic different than the first transfer characteristic. The first and second transfer characteristics include an offset from respective input values of the input signal. The device further includes an output configured to output as a differential signal the first output and the second output generated by the driver circuit, wherein the offset in the first and second transfer characteristics defines a fail-safe output state for the differential signal.

20 Claims, 7 Drawing Sheets

SYSTEMS AND METHODS FOR PROVIDING DIFFERENTIAL LINE DRIVERS

BACKGROUND

The present disclosure relates generally to differential signaling, and more particularly, to digital differential line drivers.

Differential signaling is a method of transmitting information electrically with two complementary signals sent on two paired wires, referred to as a differential pair. Differential signaling may be used for both analog and digital applications. Additionally, differential pairs may be used in different devices, such as in printed circuit boards, cables (e.g., twisted pair or ribbon cables), or connectors, among others. Differential signals may be used to convey or communicate information from one subsystem to another subsystem, for example, using a transmitter (driver) and receiver configuration operating in a differential manner. For example, at receiver side, the receiving device determines the difference between the two signals and because the receiver ignores the voltages of the wires with respect to ground, small changes in ground potential between the transmitter and receiver do not affect the ability of the receiver to detect the signal.

Differential signals may be used in wireless communication systems. For example, differential signaling may be used in satellite communications between a command receiver on the ground and electronics on a spacecraft, such using central telemetry and command units (CTCUs).

In the electronics industry, such as the portable and mobile devices technology, there is also continuing trend to lower supply voltages in order to save power and reduce unwanted emitted radiation. A low supply voltage, however, causes problems with signaling because the supply voltage reduces noise immunity of the system. Differential signaling helps to reduce these problems because, for a given supply voltage, differential signaling provides twice the noise immunity of a single-ended system. However, differential signaling may also be used in higher voltage systems (e.g., 5 volts or more) having long cable lengths many times that of single-ended systems.

However, with conventional differential driver arrangements, it is difficult (with complex controls), if not impossible, to determine whether a component has failed. Accordingly, in these conventional systems, a component failure is propagated to other parts of the systems, such as from one subsystem to another subsystem, thereby affecting the reliability of the overall system.

SUMMARY

In one embodiment, a device is provided that includes an input configured to receive an input signal and a driver circuit configured to generate a first output and a second output from the input signal. The second output is a complementary output to the first output, wherein the first output has a first transfer characteristic and the second output has a second transfer characteristic different than the first transfer characteristic. The first and second transfer characteristics include an offset from respective input values of the input signal. The device further includes an output configured to output as a differential signal the first output and the second output generated by the driver circuit, wherein the offset in the first and second transfer characteristics defines a fail-safe output state for the differential signal.

In another embodiment, a differential line driver is provided that includes a first parallel pair of series connected diodes and resistors, wherein the first parallel pair of series connected diodes and resistors is connected to an upper voltage rail. The differential line driver also includes a pair of logic gate inverters connected in series with corresponding first switches, wherein the first switches are connected in series between the first parallel pair of series connected diodes and resistors, and ground, and the pair of logic gate inverters is connected to an input to receive an input signal. The differential line driver further includes a pair of buffers connected in series with corresponding second switches and to the input, and a second parallel pair of series connected diodes and resistors, wherein the second parallel pair of series connected diodes and resistors are connected to ground, and the second switches are connected in series between the second parallel pair of series connected diodes and resistors, and the upper rail.

In another embodiment, a differential line driver is provided that includes a first parallel pair of series connected diodes and resistors, wherein the first parallel pair of series connected diodes and resistors is connected to an upper voltage rail. The differential line driver also includes a pair of buffers connected in series with corresponding first switches, wherein the first switches are connected in series between the first parallel pair of series connected diodes and resistors, and ground, and the pair of buffers are connected to an input to receive an input signal. The differential line driver further includes a pair of logic gate inverters connected in series with corresponding second switches and the input and a second parallel pair of series connected diodes and resistors, wherein the second parallel pair of series connected diodes and resistors is connected to ground, and the second switches are connected in series between the second parallel pair of series connected diodes and resistors, and the upper rail.

The features and functions that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for differential signaling. For example, some embodiments provide digital differential line drivers with fail safe features. In one or more embodiments, digital differential line drivers are configured for digital data transmission between systems and subsystems where a predetermined fail-safe state is desirable. Accordingly, in operation, if a single component failure occurs in the circuitry, the differential outputs of the driver either continue to deliver the logic output correctly or fail to a fail-safe state of choice (predefined), such as a logic 0 or a logic 1. At least one technical effect of various embodiments is the reduction or elimination of the propagation of component failure within a system, such as between different subsystems within the system. Thus, for example, a single component failure, such as an open circuit or short circuit condition does not or has a reduced chance of causing malfunction or mis-operation (or shutting down) of part of the system downstream from the failure or improperly signaling activation of another subsystem (e.g., turning on a component that is undesirable).

In various embodiments, differential line drivers are provided such that if the driver fails, the driver fails in a predictable way (e.g., to a predictable logic state) instead of randomly and unpredictably. As described in more detail herein, various embodiments are provided that fail to a logic high (logic 1) and various other embodiments are provided that fail to a logic low (logic 0). Thus, depending on the application, for example, a line driver that fails at either logic high or logic low may be used.

Figure 1:
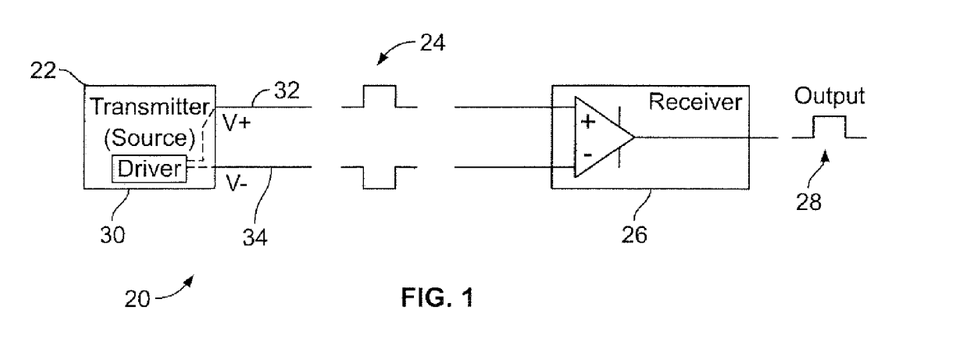
FIG. 1 is a schematic block illustration of a system in which various embodiments may be implemented.

FIG. 1 illustrates a differential signaling system 20 in accordance with various embodiments. The differential signaling system 20 includes a source, illustrated as a transmitter 22 that communicates or transmits a differential signal 24 (illustrated as differential pulses) to a receiver 26 that generates an output pulse 28. For example, in the differential signaling system 20, desired signals are added together and, for example, noise subtracted. In one embodiment, the transmitter 22 includes a differential line driver 30 (also referred to as a line driver 30) that generates a differential signal as described in more detail herein. For example, the differential line driver 30 may include as an input a digital signal generator having inputs that are transistor-transistor logic (TTL) or complementary metal-oxide-semiconductor (CMOS) compatible in some embodiments, with complementary outputs (e.g., the differential signal 24) that may be used for unipolar differential data transmission. Thus, in various embodiments, when one line 32 is at a logic high (1) and the other line 34 is at a logic low (0) the difference is a logic high (1).

In some embodiments, the line driver 30 may be formed from one or more different driver circuits as described in more detail herein. The line driver 30 provides two complementary outputs: a non-inverting output (V+) and an inverting output (V−). In various embodiments, the transfer characteristic (TC) of the V+ output is configured with an offset relative to that of the V− output. Accordingly, in some embodiments, a fail-safe state is configured to be a low or logic 0 (referred to as a Failsafe Logic 0 circuit), with the difference (e.g., the mathematic difference or difference in values) between the V+TC (where V+TC is the same as Vout_P) and the V− TC (where V− TC is the same as Vout_N) being negative. In other embodiments, the fail-safe state is configured to be a high or logic 1 (referred to as a Failsafe Logic 1 circuit), with the difference (e.g., the mathematic difference or difference in values) between the V+TC and the V− TC being positive.

In various embodiments, during normal operating conditions, such as when there is no component failure, the operation is as follows:

When input is at Logic 0, Vout_P=Logic 0, Vout_N=Logic 1; and

When input is at Logic 1, Vout_P=Logic 1, Vout_N=Logic 0.

However, in various embodiments, during fail-safe operations, the operation is as follows:

A single component failure (open or short) will not cause the circuit to operate beyond the normal or the fail-safe operating conditions; or Logic 1 for the Failsafe Logic 1 Driver, or Logic 0 for the Failsafe Logic 0 Driver.

It should be noted that the differential signaling system 20 may operate using different voltage sources or supplies for different applications. In one embodiment, the following operating characteristics are provided:

Power up with single +5V supply;

Typical current consumption: 26 mA, for 100 ohm differential load;

Input is TTL/CMOS Compatible: VIH=0.8V max, VOH=2.0V min;

Differential outputs are LVDS compatible: VT=+/−200 mV min; and

Switching frequency up to 40 kHz.

However, it should be appreciated that different operating parameters or conditions may be provided as desired or needed. For example, one or more of the parameters or conditions may be changed, such as to have a different power supply.

Figure 2:
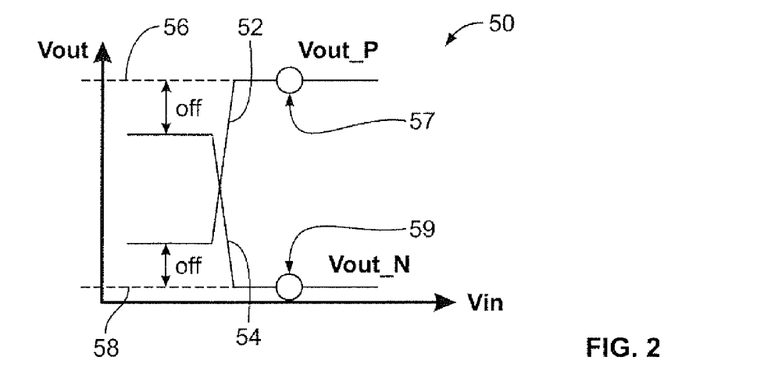
FIG. 2 is a graph illustrating transfer characteristics for an output signal generated in accordance with an embodiment.
Figure 3:
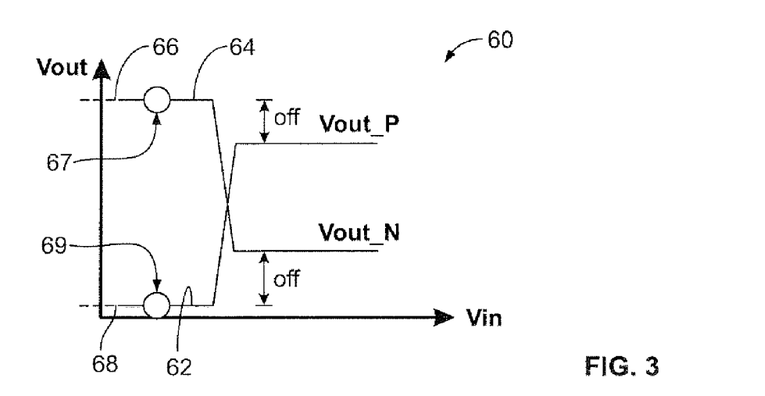
FIG. 3 is a graph illustrating transfer characteristics for an output signal generated in accordance with another embodiment.

In particular, one or more lines drivers 30 may be configured to provide the transfer characteristics illustrated in the graphs 50 and 60 of FIGS. 2 and 3, respectively. In the graphs 50 and 60, the horizontal axis corresponds to input voltage (Vin) and the vertical axis corresponds to output voltage (Vout). In some embodiments, the operating voltage is between 0-5 volts (V) defining the voltage rails (upper and lower voltage limits) for the system.

In general, the transfer characteristics provide an offset that can be used to determine, for example, a time or duration of the offset or whether a state change request was made, to identify a failure. Without the offset, the receiver 26 (shown in FIG. 1) is unable to accurately and consistently determine a failure condition. The graph 50 corresponds to the Failsafe Logic 1 transfer characteristic and the graph 60 corresponds to the Failsafe Logic 0 transfer characteristic. In particular, in the graph 50, the curve 52 corresponds to the non-inverting output (V+) and the curve 54 corresponds to the inverting output (V−). As can be seen, an offset (Off) is provided between the non-inverting output (V+) and the upper voltage rail (represented by the dashed line 56, which may be +5 V in some embodiments) and an offset (Off) is similarly provided between the inverting output (V−) and the lower voltage rail (represented by the dashed line 58, which may be 0 V in some embodiments). Thus, for example, when the offset is detected (such as by the receiver 26 shown in FIG. 1) for a certain time period and then the output stays at a logic high even when commanded to change (e.g., change of state signal), a determination is made that a component failure has occurred, as the differential signal no longer causes the output to switch to a logic low. In this configuration, the system provides, for example, that nothing is turned off during a component failure, as the output signal is maintained at a logic high. As should be appreciated, using the transfer characteristic of the graph 50, the system fail-safe condition is a logic high if either condition represented at points 57 or 59 occurs on a single component failure. Thus, the fail-safe indication is provided on the transmitter side as part of the communicated signal to allow for detection on the receiver side. It should be noted that the signals represented in the graph 50 are not time domain signals.

The graph 60 corresponds to the Failsafe Logic 0 transfer characteristic. In particular, in the graph 60, the curve 62 corresponds to the non-inverting output (V+) and the curve 64 corresponds to the inverting output (V−). As can be seen, an offset (Off) is provided between the non-inverting output (V+) and the upper rail (represented by the dashed line 66, which may be +5 V in some embodiments) and an offset (Off) is similarly provided between the inverting output (V−) and the lower rail (represented by the dashed line 68, which may be 0 V in some embodiments). As can be seen, for example, when the offset is detected (such as by the receiver 26 shown in FIG. 1) for a certain time period and then the output stays at a logic low even when commanded to change (e.g., change of state signal), a determination is made that a component failure has occurred, as the differential signal no longer causes the output to switch to a logic high. In this configuration, the system provides, for example, that nothing is turned on during a component failure, as the output signal is maintained at a logic low. As should be appreciated, using the transfer characteristic of the graph 60, the system fail-safe condition is a logic low if either condition represented at points 67 or 69 occurs on a single component failure. Thus, the fail-safe indication is again provided on the transmitter side as part of the communicated signal to allow for detection on the receiver side. It should also be noted that the signals represented in the graph 60 are not time domain signals.

Figure 4:
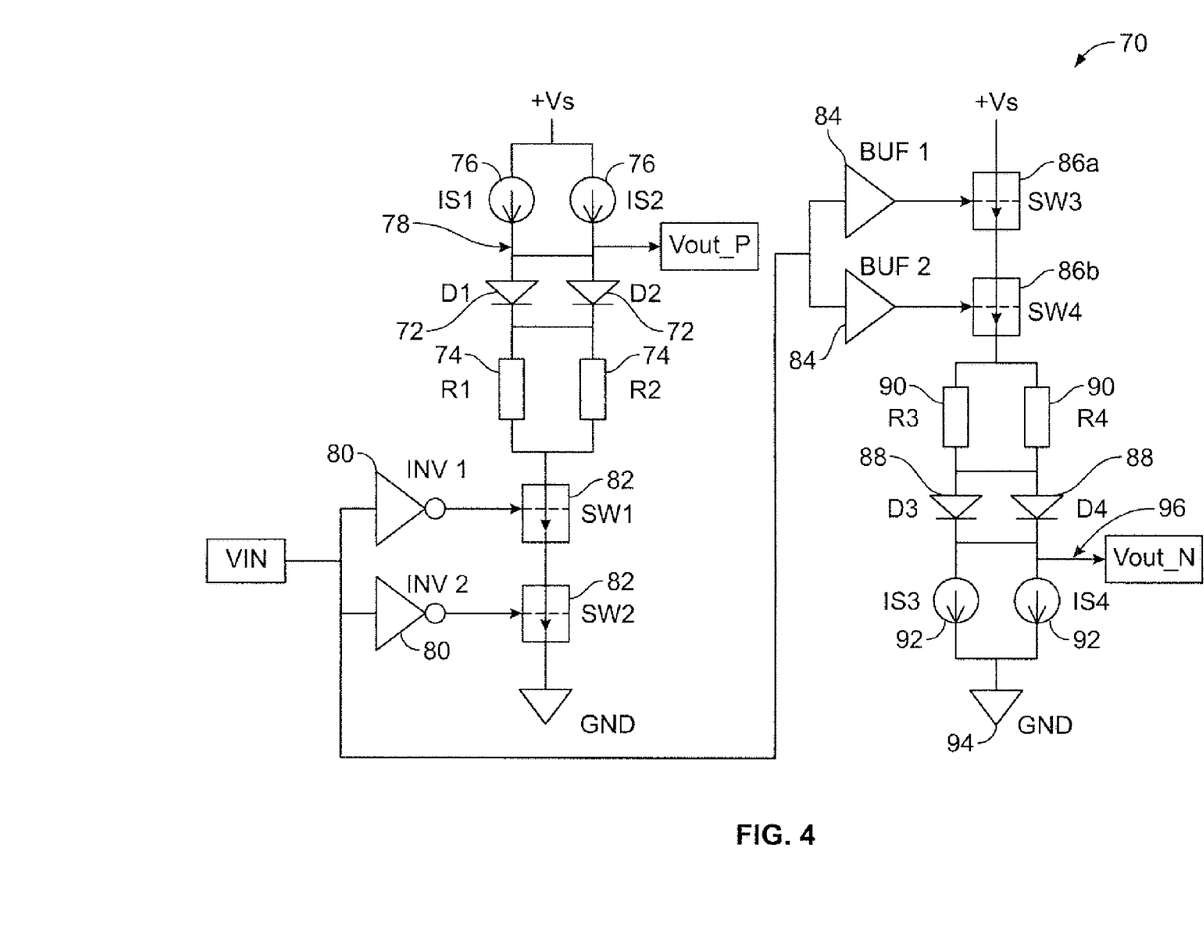
FIG. 4 is a schematic block illustration of a driver circuit in accordance with an embodiment.

FIG. 4 is a schematic diagram of one configuration driver circuit for a Fail-Safe Logic 1 driver 70. As discussed above, the Fail-Safe Logic 1 driver 70 has the transfer characteristic illustrated in the graph 50 of FIG. 2. In general, the Fail-Safe Logic 1 driver 70 provides two parallel paths such that if one path is interrupted, for example, current still flows through the other path. In particular, a parallel pair of series connected diodes 72 and resistors 74 are provided that form the two parallel paths, each having a corresponding current source 76 from the positive voltage rail (+Vs). In particular, on a single component failure, the node 78 remains at a logic high due to the parallel paths. Thus, as can be seen, the output signal remains high (Vout_P). It should be noted that the diodes 72 and resistors 74 may have any values as desired or needed, for example, based on the operating conditions of the system.

In the Fail-Safe Logic 1 driver 70, the input signal (Vin) is input at an input having a pair of logic gate inverters 80 connected to corresponding switches 82 (SW1 and SW2) that control the switching of the output of the Fail-Safe Logic 1 driver 70. For example, the input signal (Vin) is used to drive the switches 82 between open and closed positions or states. Thus, if the switches 82 are open, current flow therethrough is blocked. In a fail safe mode of operation, if the Vout_P is high and if the Fail-Safe Logic 1 driver 70 is commanded to switch, Vout_P remains at a logic high because of the parallel paths described above. In this embodiment, the diodes 72 and resistors 74 are connected between the upper rail (+Vs) and the switches 82. The switches 82 are connected between the diodes 72 and resistors 74 and ground.

Additionally, the input signal (Vin) is input to buffers 84 connected to corresponding switches 86 (86*a*-SW3 and 86*b*-SW4). The output of switch 86*b* is connected to a parallel pair of series connected diodes 88 and resistors 90 forming two parallel paths, each having a corresponding current source 92 to ground 94. Thus, the switches 86 are connected between the resistors 90 and the upper rail.

The right side of the Fail-Safe Logic 1 driver 70 as viewed in FIG. 4 (from the buffers 84 downstream) defines the inverting output side of the Fail-Safe Logic 1 driver 70 with the left side of the Fail-Safe Logic 1 driver 70 as viewed in FIG. 4 defining the non-inverting output side. On the inverting output side, on a single component failure, the node 96 remains at a logic low. Thus, in a fail safe mode of operation, if the Fail-Safe Logic 1 driver 70 is commanded to switch, regardless of the current states of the systems, the output from the differential signals remains at a logic high as the Vout_P stays high and the Vout_N stays low.

Figure 5:
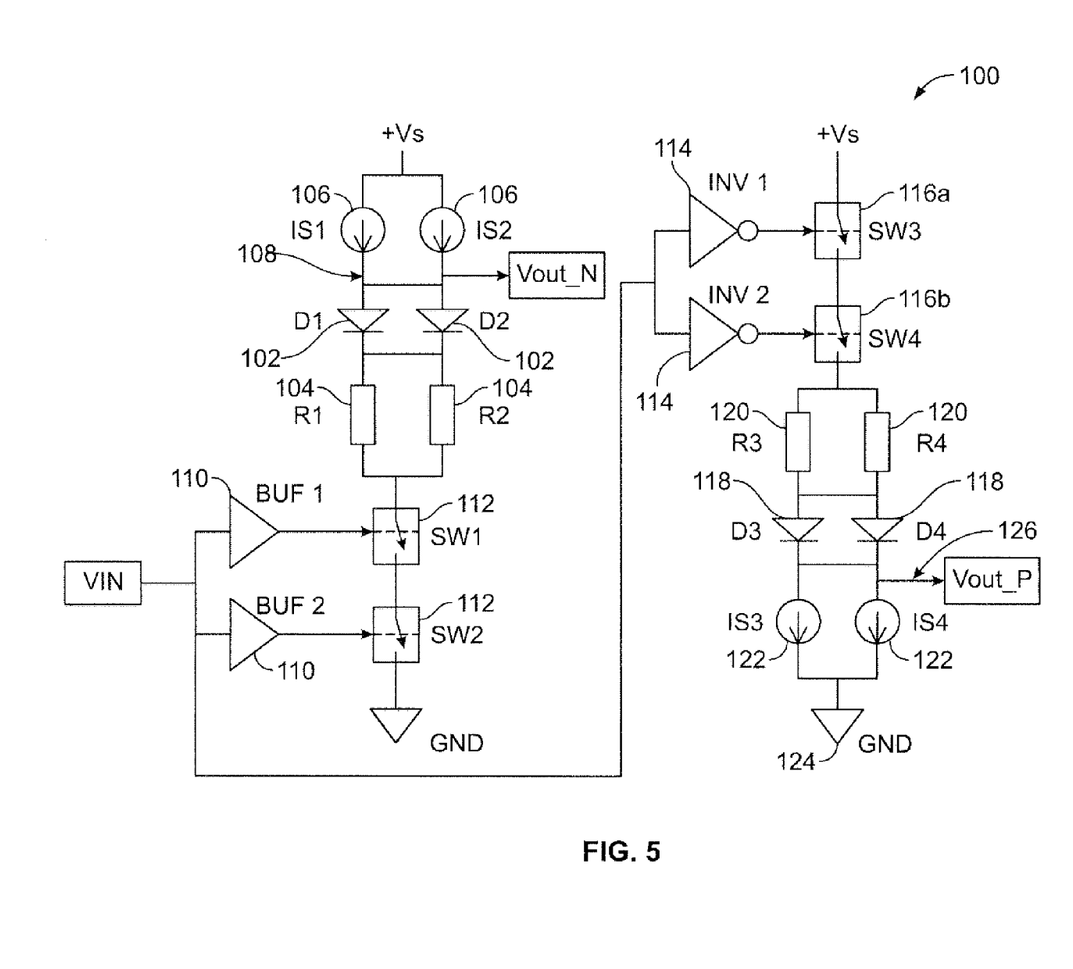
FIG. 5 is a schematic block illustration of a driver circuit in accordance with another embodiment.

FIG. 5 is a schematic diagram of driver circuit one configuration for a Fail-Safe Logic 0 driver 100. As discussed above, the Fail-Safe Logic 0 driver 100 has the transfer characteristic illustrated in the graph 60 of FIG. 3. In general, the Fail-Safe Logic 0 driver 100 provides two parallel paths such that if one path is interrupted, for example, current still flows through the other path. In particular, a parallel pair of series connected diodes 102 and resistors 104 are provided that form the two parallel paths, each having a corresponding current source 106 from the positive voltage rail (+Vs). In particular, on a single component failure, the node 108 remains at a logic low due to the parallel paths. Thus, as can be seen, the output signal remains high (Vout_N). It should be noted that the diodes 102 and resistors 104 may have any values as desired or needed, for example, based on the operating conditions of the system.

In the Fail-Safe Logic 0 driver 100, the input signal (Vin) is input to a pair of buffers 110 connected to corresponding switches 112 (SW1 and SW2) that control the switching of the output of the Fail-Safe Logic 0 driver 100. For example, the input signal (Vin) is used to drive the switches 112 between open and closed positions or states. Thus, if the switches 112 are open, current flow therethrough is blocked. In a fail safe mode of operation, if the Vout_N is low and if the Fail-Safe Logic 0 driver 100 is commanded to switch, Vout_N remains at a logic low because of the parallel paths described above. The switches 112 are connected between the diodes 102 and ground. The diodes 102 and resistors 104 are connected between the switches 112 and the upper rail.

Additionally, the input signal (Vin) is input to logic gate inverters 114 connected to corresponding switches 116 (116a-SW3 and 116b-SW4). The output of switch 116b is connected to a parallel pair of series connected diodes 118 and resistors 120 forming two parallel paths, each having a corresponding current source 122 to ground 124. Thus, the switches 116 are connected between the resistors 120 and the upper rail.

The right side of the Fail-Safe Logic 0 driver 100 as viewed in FIG. 5 (from the buffers 84 downstream) defines the non-inverting output side of the Fail-Safe Logic 0 driver 100 with the left side of the Fail-Safe Logic 0 driver 100 as viewed in FIG. 5 defining the inverting output side. On the non-inverting output side, on a single component failure, the node 126 remains at a logic high. Thus, in a fail safe mode of operation, if the Fail-Safe Logic 0 driver 100 is commanded to switch, regardless of the current states of the systems, the output from the differential signals remains at a logic low as the Vout_P stays low and the Vout_N stays high.

Thus, various embodiments provide line drivers that either continue to provide accurate differential outputs upon a component failure (such as resulting in an open-circuit or short-circuit) or default to a fail-safe output, which may be either a fail-safe high output (e.g., logic 1 output) or a fail-safe low output (e.g., logic 0 output). The fail-safe output is a predetermined and defined output that occurs upon a component failure if the differential outputs cannot continue to be accurately output using first and second transfer characteristics as described herein that include an offset from respective input values of the input signal. The fail-safe output is detectable by, for example, a receiver (e.g., the receiver 26 shown in FIG. 1) and indicative of the failure conditions, such as an open-circuit or short-circuit caused by a component failure within the system.

Figure 6:
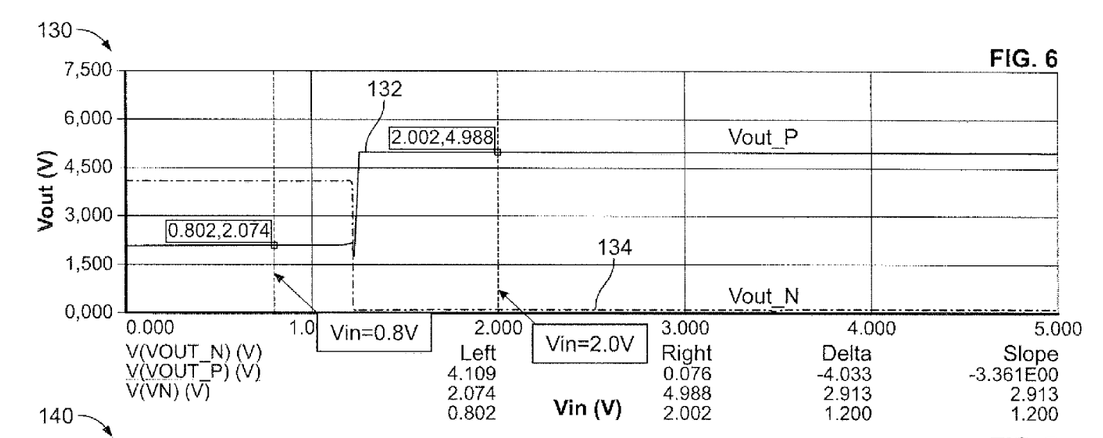
FIGS. 6 and 7 are graphs illustrating simulated output signals generated in accordance with various embodiments showing a fail-safe mode of operation.
Figure 7:
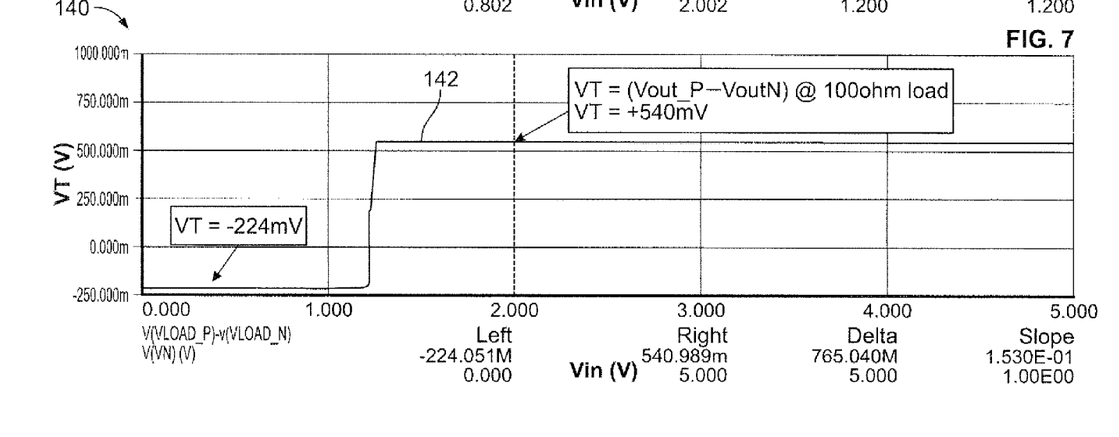

FIGS. 6 and 7 are graphs illustrating simulated results using various embodiments. In particular, the graph 130 illustrates the transfer characteristic for a fail-safe high driver, such as the Fail-Safe Logic 1 driver 70 shown in FIG. 2. The graph 140 illustrates the corresponding differential output signal of the Fail-Safe Logic 1 driver 70. In the graphs 130 and 140, the horizontal axis corresponds to the input voltage Vin and the vertical axis corresponds to the individual outputs in the graph 130 and the differential output (Vout_P−Vout_N) in the graph 140. In the graph 130, the curve 132 is the non-inverting output and the curve 134 is the inverting output. In the graph 140, the curve 142 is the differential output.

As can be seen in the graph 140, which represents the differential signal received by the receiver, during a normal operating condition, the offset between the V+TC and the V-TC is negative, which is −224 mV in this example. However, upon a failure condition, the differential output signal becomes a fail-safe high output, represented by the +540 mV output in the graph 140. In this fail-safe high mode of operation, even if a control or command signal is sent to switch to a low output, the differential output will remain high, indicating a failure, such as of one of the components.

Figure 8:
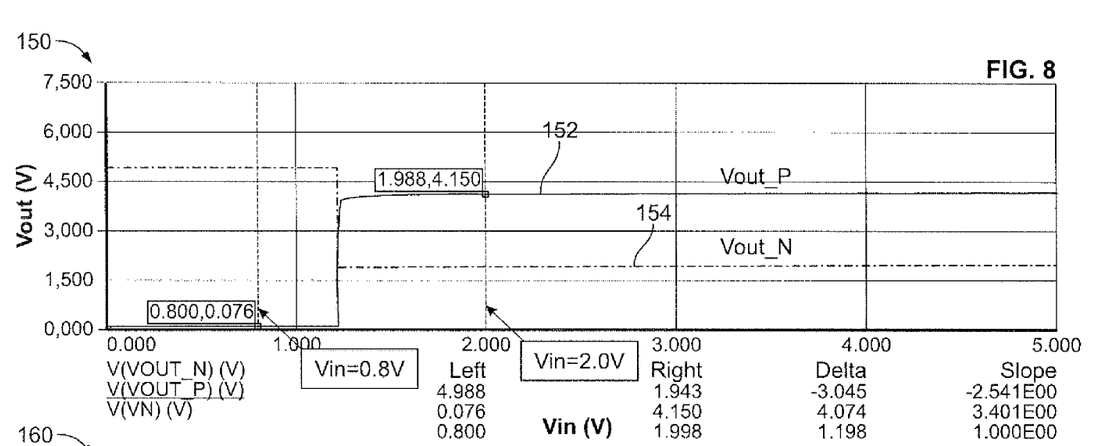
FIGS. 8 and 9 are graphs illustrating simulated output signals generated in accordance with various embodiments showing another fail-safe mode of operation.
Figure 9:
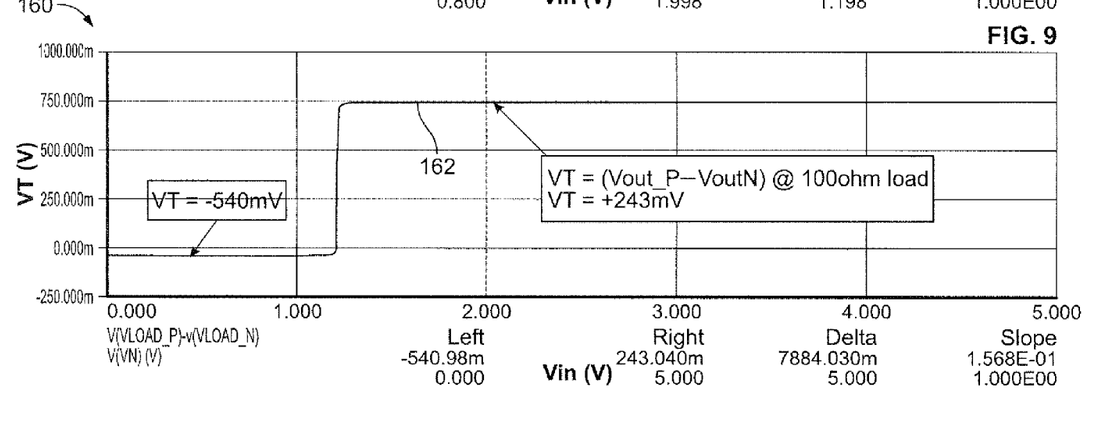

FIGS. 8 and 9 are graphs illustrating other simulated results using various embodiments. In particular, the graph 150 illustrates the transfer characteristic for a fail-safe low driver, such as the Fail-Safe Logic 0 driver 100 shown in FIG. 5. The graph 160 illustrates the corresponding differential output signal of the Fail-Safe Logic 0 driver 100. In the graphs 150 and 160, the horizontal axis corresponds to the input voltage Vin and the vertical axis corresponds to the individual outputs in the graph 150 and the differential output (Vout_P−Vout_N) in the graph 160. In the graph 150, the curve 152 is the non-inverting output and the curve 154 is the inverting output. In the graph 160, the curve 162 is the differential output.

As can be seen in the graph 160, which represents the differential signal received by the receiver, during a normal operating condition, the offset between the V+TC and the V-TC is positive, which is +243 mV in this example. However, upon a failure condition, the different output signal becomes a fail-safe low output, represented by the −540 mV output in the graph 9. In this fail-safe low mode of operation, even if a control or command signal is sent to switch to a high output, the differential output will remain low, indicating a failure, such as of one of the components.

Figure 10:
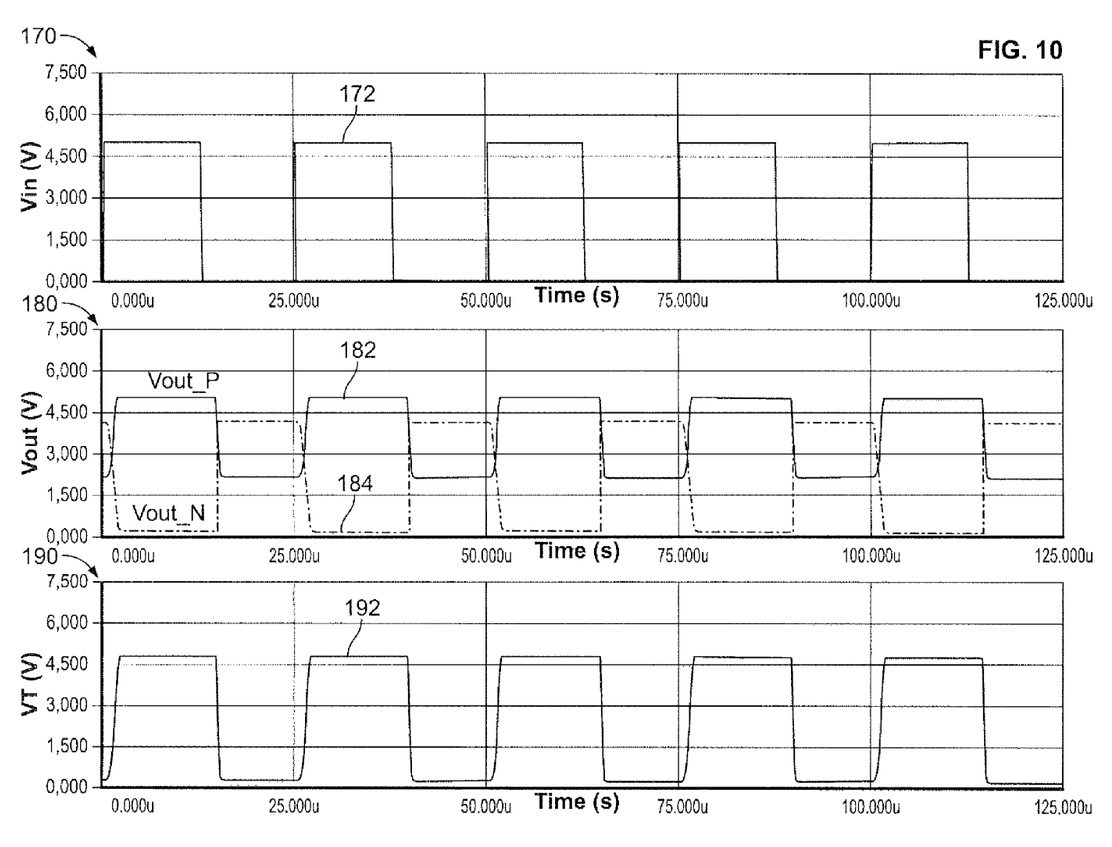
FIG. 10 illustrates graphs of normal operation of a driver circuit in accordance with various embodiments.

FIG. 10 illustrates graphs of outputs illustrating operation under normal operating conditions. In the graphs 170, 180 and 190 the horizontal axis represents time and the vertical axis represent voltage. The graph 170 shows a curve 172 representing an input signal over time. The graph 180 shows curves 182 and 184 corresponding to the non-inverting and inverting outputs for the driver, respectively. The graph 190 shows a curve 192 corresponding to the differential output signal from the driver. As can be seen, as the input signal switches between low and high states (illustrates as 0 V and +5V) the differential output similarly switches between a low output (−243 mV in this example) and a high output (+540 mV in this example). However, as illustrated in the graphs 6-9, during a failure condition, the differential output signal is maintained at a high output or low output (depending on the fail-safe mode of operation of the driver) regardless of switching of the input signal.

Figure 11:
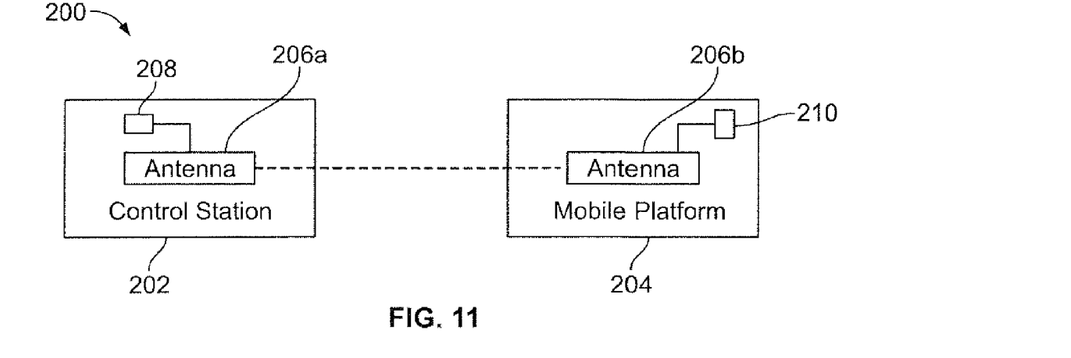
FIG. 11 is a block diagram illustration of a communication system having a signal driver in accordance with one embodiment.

As shown in FIG. 11, the various embodiments, including the differential line driver described herein may be used in different applications. For example, the fail-safe drivers described herein may be used for communication between a control station 202 (e.g., an aircraft control tower or ground station) and a mobile platform 204 (e.g., an aircraft or spacecraft), each having a respective antenna 206 for communicating wirelessly therebetween. In various embodiments, differential signaling is used as described herein. In this embodiment, a transmitter 208 (which may be embodied as the transmitter 22 shown in FIG. 1) is configured to transmit via the antenna 206a a differential signal that is received by a receiver 210 (which may be embodied as the receiver 26 shown in FIG. 1) via the antenna 206b. In this embodiment, if a component failure occurs, for example, within the transmitter 208, a fail-safe mode of operation results as described herein. Thus, a determination may be made as to whether the signal is a valid signal or a fail-safe signal.

Figure 12:
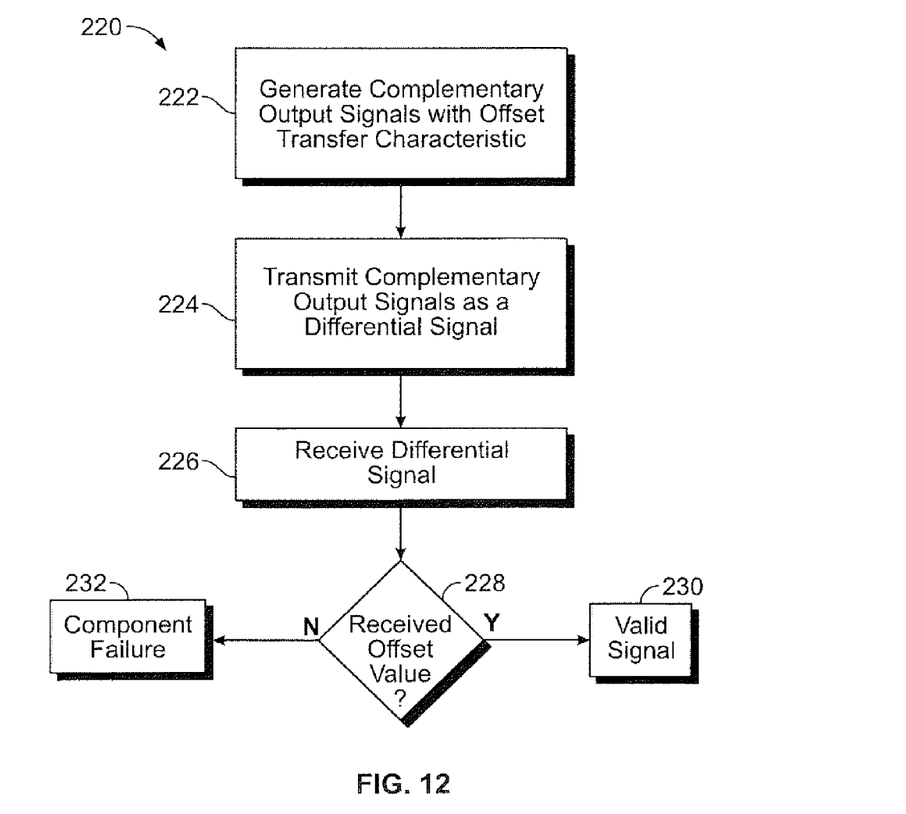
FIG. 12 is an illustration of operations performed by various embodiments to provide differential signaling.

Various embodiments also provide a method 220 as shown in FIG. 12 for communicating using a fail-safe differential signal, such as with one or more of the differential line drivers described herein. In various embodiments, the method 220, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 220 may be able to be used as one or more algorithms to direct hardware to perform operations described herein.

The method 220 includes generating complementary output signals at 222 having an offset transfer characteristic. For example, as described herein, the complementary signals may be offset from the high and low rails (high and low input signals) of the system. The method also includes transmitting the complementary output signals as a differential signal at 224. As should be appreciated, as a result of the offset, the differential output is likewise offset from the high and low levels or states from the rail values. Thus, a differential output corresponding to a logic high or logic low is at a value offset from the input value, but still at a high or low level (e.g., offset by a predetermined or defined amount).

The differential signal is then received at 226 and a determination is made as to whether the differential signal is an offset value signal at 228. For example, if the received signal is at the offset value for a logic high or low, then a determination is made at 230 that the signal is valid. However, if the received signal is not at the offset value, such as at one of the rails, then a determination is made at 232 that a system component failure occurred (and the output remains at the fail-safe level even if commanded to change).

Thus, various embodiments provide a line driver for differential signaling that allows for determination of a failure condition using a default fail-safe mode of operation.

It also should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A device comprising:
   an input configured to receive an input signal;
   a driver circuit configured to generate a first output and a second output from the input signal, the second output being a complementary output to the first output, the first output having a first transfer characteristic and the second output having a second transfer characteristic different than the first transfer characteristic, the first and second transfer characteristics including an offset from respective input values of the input signal; and
   an output configured to output as a differential signal the first output and the second output generated by the driver circuit, wherein the offset in the first and second transfer characteristics defines a fail-safe output state for the differential signal.

2. The device of claim 1, wherein the fail-safe output state is an output high state, and a difference between the first transfer characteristic of the first output and the second transfer characteristic of the second output is positive.

3. The device of claim 2, wherein the output high state is a logic 1 state.

4. The device of claim 1, wherein the fail-safe output state is an output low state, and a difference between the first transfer characteristic of the first output and the second transfer characteristic of the second output is negative.

5. The device of claim 4, wherein the output low state is a logic 0 state.

6. The device of claim 1, wherein the driver circuit comprises a parallel pair of series connected diodes and resistors forming parallel current paths.

7. The device of claim 6, further comprising a pair of buffers and connected switches, wherein the switches are connected in series with the parallel pair of series connected diodes and resistors.

8. The device of claim 6, further comprising a pair of logic gate inverters and connected switches, wherein the switches are connected in series with the parallel pair of series connected diodes and resistors.

9. The device of claim 1, wherein the first output is a non-inverting output and the second output is an inverting output, the offset of the non-inverting output being a predefined value from an upper rail and the offset of the inverting output being a predefined value from a lower rail, wherein the upper and lower rails define upper and lower limits of the input signal.

10. The device of claim 1, wherein the driver circuit is configured to maintain the differential signal at an output high state when the input signal changes states during a failure condition including one of an open-circuit condition or a short-circuit condition.

11. The device of claim 1, wherein the driver circuit is configured to maintain the differential signal at an output low state when the input signal changes states during a failure condition including one of an open-circuit condition or a short-circuit condition.

12. The device of claim 1, wherein the driver circuit is one of TTL or CMOS compatible.

13. A differential line driver comprising:
    a first parallel pair of series connected diodes and resistors, the first parallel pair of series connected diodes and resistors connected to an upper voltage rail;
    a pair of logic gate inverters connected in series with corresponding first switches, wherein the first switches are connected in series between the first parallel pair of series connected diodes and resistors, and ground, the pair of logic gate inverters connected to an input to receive an input signal;
    a pair of buffers connected in series with corresponding second switches and to the input; and
    a second parallel pair of series connected diodes and resistors, the second parallel pair of series connected diodes and resistors connected to ground, wherein the second switches are connected in series between the second parallel pair of series connected diodes and resistors, and the upper rail.

14. The differential line driver of claim 13, wherein the first and second parallel pair of series connected diodes and resistors are configured to generate a first output and a second output from the input signal, the second output being a complementary output to the first output, the first output having a first transfer characteristic and the second output having a second transfer characteristic different than the first transfer characteristic, the first and second transfer characteristics including an offset from respective input values of the input signal, wherein the offset in the first and second transfer characteristics defines a fail-safe output state for the differential signal.

15. The differential line driver of claim 14, wherein the fail-safe output state is an output high state, and a difference between the first transfer characteristic of the first output and the second transfer characteristic of the second output is positive.

16. The differential line driver of claim 15, wherein the output high state is a logic 1 state.

17. A differential line driver comprising:
    a first parallel pair of series connected diodes and resistors, the first parallel pair of series connected diodes and resistors connected to an upper voltage rail;
    a pair of buffers connected in series with corresponding first switches, wherein the first switches are connected in series between the first parallel pair of series connected diodes and resistors, and ground, the pair of buffers connected to an input to receive an input signal;
    a pair of logic gate inverters connected in series with corresponding second switches and the input; and
    a second parallel pair of series connected diodes and resistors, the second parallel pair of series connected diodes and resistors connected to ground, wherein the second switches are connected in series between the second parallel pair of series connected diodes and resistors, and the upper rail.

18. The differential line driver of claim 17, wherein the first and second parallel pair of series connected diodes and resistors are configured to generate a first output and a second output from the input signal, the second output being a complementary output to the first output, the first output having a first transfer characteristic and the second output having a second transfer characteristic different than the first transfer characteristic, the first and second transfer characteristics including an offset from respective input values of the input signal, wherein the offset in the first and second transfer characteristics defines a fail-safe output state for the differential signal.

19. The differential line driver of claim 18, wherein the fail-safe output state is an output low state, and a difference between the first transfer characteristic of the first output and the second transfer characteristic of the second output is negative.

20. The differential line driver of claim 19, wherein the output low state is a logic 0 state.

* * * * *